United States Patent [19]
Shimamune et al.

[11] Patent Number: 5,589,052
[45] Date of Patent: Dec. 31, 1996

[54] METHOD FOR ELECTROLYZING WATER

[75] Inventors: Takayuki Shimamune, Tokyo; Shuji Nakamatsu, Kanagawa; Isao Sawamoto, Kanagawa; Yoshinori Nishiki, Kanagawa, all of Japan

[73] Assignee: Permelec Electrode Ltd., Kanagawa, Japan

[21] Appl. No.: 759,975

[22] Filed: Sep. 17, 1991

Related U.S. Application Data

[63] Continuation of Ser. No. 413,495, Sep. 27, 1989.

[30]  Foreign Application Priority Data

Sep. 29, 1988 [JP] Japan .................................. 1-244979

[51] Int. Cl.$^6$ ................................................. C25B 15/00
[52] U.S. Cl. ........................ 205/349; 205/626; 205/628
[58] Field of Search .................................... 204/101, 129, 204/252, 263, 282; 205/349, 626, 785.5

[56] References Cited

U.S. PATENT DOCUMENTS

| | | | |
|---|---|---|---|
| 3,592,749 | 7/1971 | Grangaard | 204/84 |
| 4,416,747 | 11/1983 | Menth et al. | 204/129 |

FOREIGN PATENT DOCUMENTS

| | | |
|---|---|---|
| 0027146 | 4/1981 | European Pat. Off. . |
| 1190352 | 5/1970 | United Kingdom . |

OTHER PUBLICATIONS

J. Elec. Soc., vol. 132, No. 2, pp. 367–371 (Feb. 1985).
Brown Boveri Review, vol. 73, Aug. 1986, No. 8, Bader, Switzerland; "Ozone generation by means of MEMBREL electrolysis: A process for treating ultra–pure water", pp. 451–456.

*Primary Examiner*—Kathryn Gorgos
*Attorney, Agent, or Firm*—Sughrue, Mion, Zinn, Macpeak & Seas

[57] ABSTRACT

A method and apparatus for water electrolysis is described, using an electrolytic cell comprising an anode compartment, a cathode compartment, and a diaphragm separating the anode and cathode compartments, comprising the steps of electrolyzing water to evolve oxygen or an ozone-containing oxygen gas in the anode compartment and hydrogen in the cathode compartment, thereby resulting in a net transfer of electrolyte from the anode compartment to the cathode compartment through the diaphragm, and recycling electrolyte from the cathode compartment to the anode compartment.

1 Claim, 2 Drawing Sheets

METHOD FOR ELECTROLYZING WATER

This is a continuation of application Ser. No. 07/413,495 filed Sep. 27, 1989.

BACKGROUND OF THE INVENTION

The present invention relates to a method and apparatus for obtaining hydrogen, oxygen and ozone by efficient electrolysis of water.

Electrolysis of water is a technique that has been commonly practiced to produce hydrogen and oxygen (or ozone). In a typical system, hydrogen gas is produced in an electrolytic cell equipped with a diaphragm and containing an aqueous potassium hydroxide solution as an electrolyte. The product hydrogen gas is utilized, for example, as a hydrogen source in ammonia synthesis. A subject of interest that has drawn researchers' attention regarding the electrolysis of water involves methods of increasing the electric power utilization efficiency. An electrolysis process that has recently gained popularity employs a SPE (solid polymer electrolyte) cell wherein a fluorine resin based ion-exchange membrane used as a diaphragm is sandwiched between an anode and a cathode to form a solid electrolyte, as described in U.S. Pat. No. 4,416,747 and *J. Elec. Chem. Soc.*, 132, p. 367 ff (1985). Electrolysis is performed with water supplied from the anode side that is transferred through the ion-exchange membrane toward the cathode side. Having various advantages including a minimum energy requirement for gas evolution, the SPE method is considered to be the most desirable of all techniques available for the electrolysis of water. However, in this method, the amount of water supplied at the anode which transfers toward the cathode is at least 4 to 5 times as much as the volume of water necessary for gas evolution at the cathode. Part of the transferred water must be taken out of the system, with a subsequent increase in the amount of water added and an increase in the operational complexity of system operation. If the transferred water accumulated in the cathode compartment is not removed from the system, the resulting pressure imbalance causes difficulty in recovering the gas evolved at the cathode. This problem has also been recognized in other methods of water electrolysis that employ conventional electrodes. The manner in which to deal with the excess catholyte has always been of great concern to those skilled in the art.

SUMMARY OF THE INVENTION

An object, therefore, of the present invention is to provide a method of water electrolysis that enables continuous operation by obviating the need for catholyte removal, a long encountered problem in the prior art methods of water electrolysis.

Another object of the present invention is to provide an apparatus suitable for use in implementing the above described method.

The first objective of the present invention is attained by a method of water electrolysis using an electrolytic cell comprising an anode compartment, a cathode compartment, a diaphragm separating the anode and cathode compartments and means for recycling electrolyte from the cathode compartment to the anode compartment, comprising the steps of electrolyzing water to evolve oxygen or an ozone-containing oxygen gas in the anode compartment and hydrogen in the cathode compartment thereby resulting in a net transfer of electrolyte from the anode compartment to the cathode compartment through the diaphragm, and recycling the accumulated electrolyte from the cathode compartment to the anode compartment.

The second object of the present invention is attained by an electrolytic cell for water electrolysis comprising an anode compartment, a cathode compartment, a diaphragm separating the anode and cathode compartments, and means for recycling electrolyte from the cathode compartment to the anode compartment. Alternatively, the accumulated catholyte may be recycled to the anode compartment by means of a pump.

DETAILED DESCRIPTION OF THE INVENTION

Figure 1:
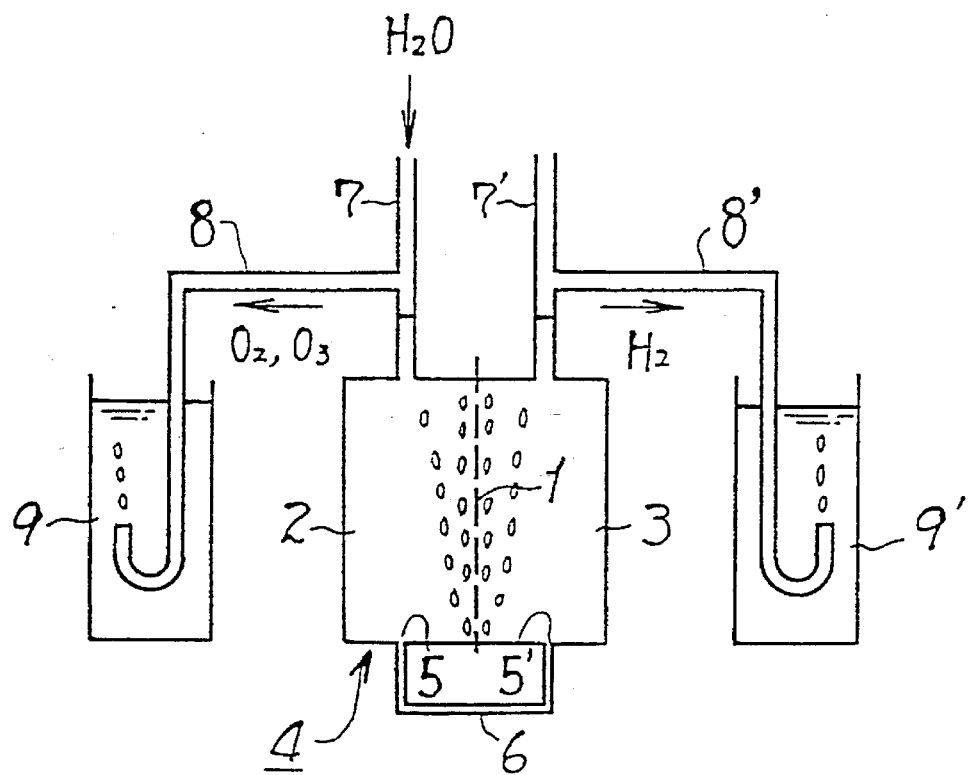
FIG. 1 is a schematic cross section of an apparatus according to a first embodiment of the present invention.

The method and apparatus of the present invention employs an electrolytic cell comprising an anode compartment and a cathode compartment separated by a diaphragm, in particular, an ion-exchange membrane. As used herein, an anode compartment and a cathode compartment are considered to include an anode substance, electrode or electrode active material and a cathode substance, electrode or electrode active material. The electrolytic cell is preferably of a vertical type in which the diaphragm is positioned vertically. Ordinary electrodes having a porous plate form may be used, but in order to improve power efficiency, the use of a SPE (solid polymer electrolyte) as the ion-exchange membrane having an electrode active material provided on opposite sides of the diaphragm is preferred. Current collectors are attached to each of the electrodes or electrode substances, to allow for electric correction of the electrodes or electrode substances to a power supply.

When electrolysis of water, and preferably pure water is performed in the above-described electrolytic cell, the water being supplied to the anode compartment, oxygen (or an ozone-containing oxygen gas, if conditions permit) is evolved in the anode compartment, whereas hydrogen is evolved in the cathode compartment. During the electrolysis, the water supplied to the anode compartment permeates through the diaphragm to enter the cathode compartment. The amount of water transfer to the cathode compartment is greater than the volume of water normally consumed by electrolysis in the cathode compartment, thereby resulting in a gradual increase in the amount of catholyte.

According to the present invention, part of the catholyte having an increased water content is recycled to the anode compartment either through a conduit or by means of a pump. In a first embodiment, a hole is bored through the bottom plate of each of the anode and cathode compartments and the two holes are connected by a conduit to establish a free passage of the electrolyte, thereby allowing the accumulated catholyte to return to the anode compartment through the conduit. The holes may be formed in the side walls of the electrolytic cell but should be located where the side walls are always in contact with the electrolyte. If the gas evolved at one electrode flows through the conduit to reach the other electrode, the resulting gas mixture creates an explosion hazard. Therefore, even when the holes are bored through the bottom plate of the electrolytic cell, holes are preferably positioned as remotely as possible from the electrodes where gas evolution occurs.

When the anode and cathode compartments are connected by the conduit, the potential energy difference (i.e., relative height of the electrolyte in each of the cell compartments) between the electrolyte in the anode compartment and that in the cathode compartment provides a driving force for the spontaneous movement of the catholyte without requiring any other power source. It should, however, be noted that the recycling of the catholyte to the anode compartment may be accelerated by using means such as a pump. If means such as a pump is used, the catholyte need not be directly recycled to the anode compartment, but instead, may be returned to the water supply line of the anode compartment.

The oxygen and/or ozone evolved in the anode compartment and the hydrogen evolved in the cathode compartment may be recovered and used in the usual manner. If an ozone-containing oxygen gas evolves in the anode compartment, the anolyte containing dissolved ozone-containing gas may be used, for example, for the disinfection of city water. It is, however, more desirable to separate the ozone-containing oxygen gas from the anolyte and to use the ozone-containing gas to treat city water or other fluids either directly or after being dissolved in water to prepare an aqueous solution of ozone at a desired concentration.

According to the present invention, all of the water supplied to the electrolytic cell is effectively subjected to electrolysis, such that the volume of water consumed is reduced to about one fifth of the amount that has been conventionally used in prior art systems of water electrolysis.

The present invention is described below in greater detail with reference to FIGS. 1–3 which depict three embodiments of the apparatus for water electrolysis according to the present invention.

FIG. 1 is a schematic cross-sectional view showing a first embodiment of the apparatus. A SPE type ion-exchange membrane 1 having an electrode active material formed on both sides thereof is positioned in an electrolytic cell 4 to divide the interior of the cell into two compartments, one being an anode compartment 2 and the other being a cathode compartment 3. Holes 5 and 5' have been bored through the bottom plate of the anode compartment 2 and the other being a cathode compartment 3, respectively, and the two holes are connected by a small-diameter conduit 6. A pair of pipes 7 and 7' extend upwardly from the cover plate of the cell 4 on positions that correspond to the anode compartment 2 and the cathode compartment 3, respectively. Water for electrolysis is supplied to the anode compartment through the pipe 7, to fill the electrolytic cell. Branch pipes 8 and 8' extend outwardly from the pipes 7 and 7' at their middle portion and are bent downwardly, with the end of each of pipes 8 and 8' being bent upwardly in U shape. The lower part of branch pipes 8 and 8' are submerged in an absorbing vessels 9 and 9' respectively, each being filled with water.

When an electric potential is applied across the anode and cathode materials provided on opposing sides of the membrane, an electric current is passed through the electrolytic cell to electrolyze the electrolyte in the anode and cathode compartments. Pure water is supplied to the anode compartment 2 of the electrolyzer described above through the pipe 7. The anolyte in the anode compartment is electrolyzed to evolve oxygen or an ozone-containing oxygen gas at the anode electrode active material and the evolved gas is directed through the pipe 7 and the branch pipe 8 to be admitted into the absorbing vessel 9, where an aqueous solution of ozone is formed. Due to the electric field applied across the electrolytic cell, there is a net transfer of anolyte from the anode compartment to the cathode compartment 3 through the ion-exchange membrane 1. The catholyte is electrolyzed in the cathode compartment 3 to evolve hydrogen gas. The evolved hydrogen gas is directed through the pipe 7' and the branch pipe 8' and is then discharged from the system.

As the anolyte flows into the cathode compartment, the volume of catholyte increases. However, the anode compartment 2 is connected to the cathode compartment 3 via the conduit 6. The accumulated catholyte flows back to the anode compartment 2 through the conduit such that the electrolyte level in each of the compartments is substantially the same. Since the liquid level in each of the two compartments is always kept substantially the same, water is therefore electrolyzed efficiently without requiring the additional cumbersome step of removing excess catholyte and disposing thereof.

Figure 2:
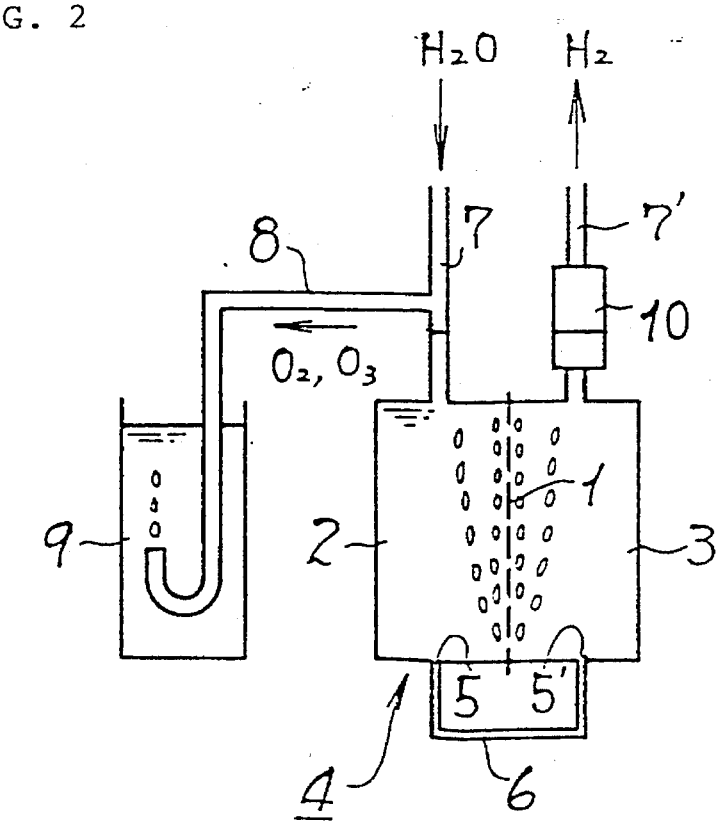
FIG. 2 is a schematic cross section of an apparatus according to a second embodiment of the present invention.

FIG. 2 is a schematic cross-sectional view of a second embodiment of the apparatus of the present invention. Like components as shown in FIG. 1 are identified by like reference numbers. A degassing valve 10 is provided in-line with the pipe 7' extending from the cathode compartment 3. The hydrogen gas evolved in the cathode compartment is removed from the system when the degassing valve is open.

Figure 3:
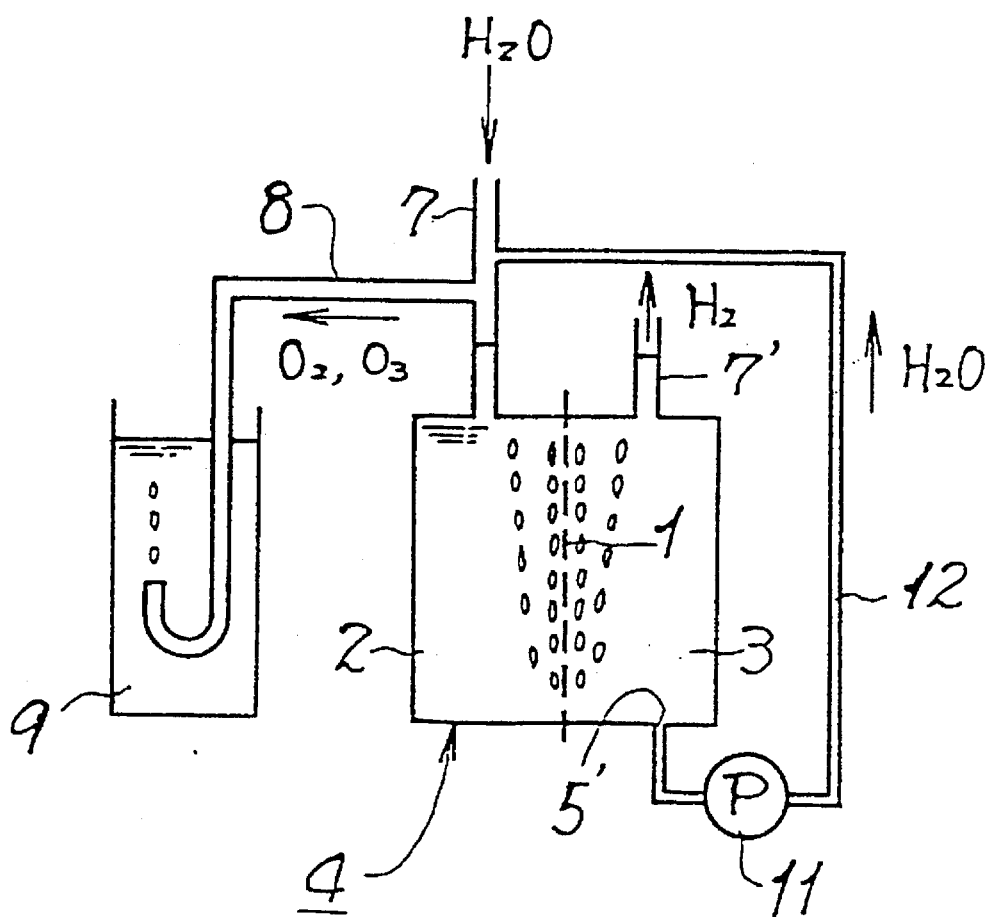
FIG. 3 is a schematic cross section of an apparatus according to a third embodiment of the present invention.

FIG. 3 is a schematic cross-sectional view of a third embodiment of the apparatus of the present invention. Like components as shown in FIG. 1 are identified by like reference numbers. A recycling conduit 12 equipped with a circulating pump 11 is connected at one end to the hole 5' bored through the bottom plate of the cathode compartment 3, and the other end of the conduit 12 is connected to the pipe 7 extending from the compartment.

The following nonlimiting examples further illustrate the present invention.

EXAMPLE 1

An ion-exchange membrane (Nafion® #117, produced by du Pont) having a layer of β-lead dioxide (anode side) and platinum (cathode side) formed on opposite sides thereof, each layer having an area of 20 $cm^2$, was installed in a 300-ml electrolytic cell filled with ion-exchange treated water. A pressure regulating valve was mounted at the gas outlet of the cathode compartment. The anode and cathode compartments were connected via a conduit (internal diameter 10 mm), each end of which was inserted into the bottom plate of the electrolytic cell. In this manner, a SPE type electrolytic cell of the present invention was completed. With the internal gas pressure of the anode and cathode compartments being kept substantially equal to each other by means of the pressure regulating valve, an electric current was passed through the pure water at a current density of 100 $A/dm^2$, a cell voltage of 3.5 volts and an electrolyte temperature of 30° to evolve an ozone-containing oxygen gas in the anode compartment. During the electrolysis, no additional pure water was supplied but the level of the electrolyte in the cathode compartment remained the same as that in the anode compartment, with the total decrease in the amount of water in the electrolytic cell being about 8 ml/hr.

In comparison, water electrolysis was conducted with an electrolytic cell of the same construction and under the same conditions as described above except that a conduit was not provided connecting the anode and cathode compartments.

The result was as follows. The anolyte transferred to the cathode compartment at a flow rate of about 30 ml/hr, with the total decrease in the amount of anolyte being about 40 ml/hr.

The present invention provides a method and apparatus for electrolyzing water such that water transferred from the anode compartment of a diaphragm-equipped electrolytic cell to the cathode compartment through the diaphragm is returned to the anode compartment. Since the volume of catholyte does not increase as the electrolysis proceeds, there is no excess catholyte to remove such that the electrolysis operation may be carried out continuously. Furthermore, water, and in particular pure water, supplied as the starting material is efficiently utilized in electrolysis, and the volume of water consumption is reduced to about one fifth of the quantity consumed by conventional electrolysis apparatus. In addition, the apparatus of the present invention is simplified in that equipment for removing excess catholyte from the system of water electrolysis is no longer needed. Therefore, the size and cost of the electrolysis apparatus of the present invention is reduced as compared to a conventional electrolysis apparatus.

While the invention has been described in detail and with reference to specific examples thereof, it will be apparent to one skilled in the art that various changes and modifications can be made therein without departing from the spirit and scope thereof.

What is claimed is:

1. A method of water electrolysis using an electrolytic cell comprising an anode compartment, a cathode compartment, a diaphragm separating the anode and cathode compartments, means for recycling electrolyte from the cathode compartment to the anode compartment comprising a conduit connecting the anode and cathode compartments, and a water supply line for the anode compartment, comprising the steps of supplying through said water supply line an electrolyte of pure water to the anode compartment alone and not to the cathode compartment, which water permeates the diaphragm to enter the cathode compartment, electrolyzing the water electrolyte to evolve an ozone-containing oxygen gas in the anode compartment and hydrogen in the cathode compartment, thereby resulting in a net transfer of electrolyte from the anode compartment to the cathode compartment through the diaphragm, maintaining the internal gas pressures of the anode and cathode compartments substantially equal to each other, and recycling the water electrolyte from the cathode compartment to the anode compartment through the conduit such that the liquid level in the anode and cathode compartments is kept substantially the same.

\* \* \* \* \*